Figure 1:
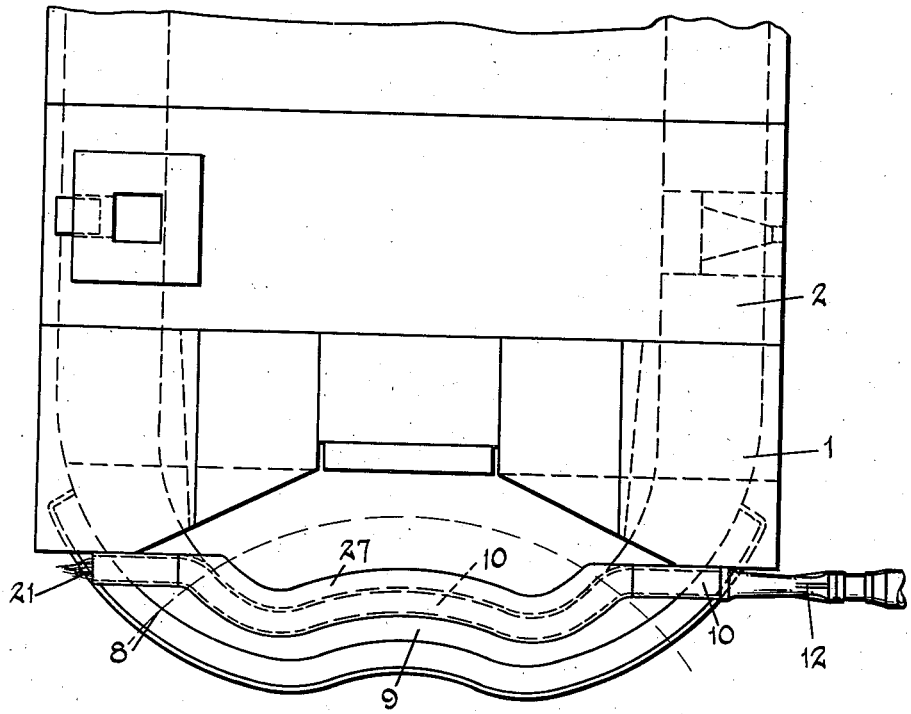

Nov. 25, 1941.    G. W. BATCHELL    2,264,232
FOREBAY
Filed April 13, 1940    3 Sheets-Sheet 1

Inventor
George W. Batchell
By Faust F. Crampton
Attorney

Nov. 25, 1941.  G. W. BATCHELL  2,264,232
FOREBAY
Filed April 13, 1940   3 Sheets-Sheet 3

Inventor
George W. Batchell
By [signature]
Attorney

Patented Nov. 25, 1941

2,264,232

UNITED STATES PATENT OFFICE 2,264,232

FOREBAY

George W. Batchell, Toledo, Ohio

Application April 13, 1940, Serial No. 329,514

5 Claims. (Cl. 49—56)

My invention has for its object to provide a means for maintaining the glass, in the forebay of a glass-melting furnace, at a uniform high temperature.

The glass is usually drawn from the forebay and shaped into glass articles by the use of molds. The molds, into which the glass is drawn, are carried and moved relative to the forebay, while partially submerged in the glass of the forebay, by a glass-forming machine, causing circulation of portions of the glass in the forebay and distribution and exchange of heat between said portions. However, the peripheral portion of the glass in the forebay, by reason of its remoteness from the heat of the furnace and path of the mold movement through the forebay, ordinarily, does not, thus, circulate and becomes chilled, and, by reason of the increased viscosity of the glass, thus, first drawn into the molds, prevents exact conformation to the surface of the interior of the molds and, also, produces a limited circuitous movement of the surface glass within the forebay by the movement of the molds.

The peripheral edge of the surface of the glass of the forebay is chilled by the upwardly and outwardly inclined radiation from the inner, upper corner of the protruding wall of the forebay and, also, by like radiation from the outer edge of the surface glass of the forebay to the inner, upper corner of the protruding wall and to the air, and, also, by the conduction of heat from the edge of the surface glass of the forebay to the inner, upper corner of the protruding wall of the forebay that is cooled by the said radiation from the said corner. The invention, thus, provides a method and a forebay structure for producing, at the upper, inner corner of the protruding wall of the forebay, at least sufficient heat to compensate for that lost by radiation and conduction of heat from the marginal edge of the surface glass of the forebay.

Any form of suitable heating unit may be utilized for maintaining the marginal portion of the surface glass of the forebay at, substantially, a uniform heat, notwithstanding the radiation and conduction therefrom. The inner, upper corner of the forebay and the outer edge of the surface glass may be heated by an extended flame or electrically heated by a plurality of heat units. The invention, thus, provides a highly heated refractory, heat-conductive tube at the edge of the forebay. The tube is formed of a suitable metal alloy located contiguous to the glass and, preferably, in contact therewith and interiorly heated to maintain the required fluidity of the glass within a considerable region in which the heat-conductive tube is located.

The invention, also, provides a heat radiant extending along the glass at the outer edge of the forebay that may be in contact with glass and, preferably, overhangs a material part of the marginal portion of the glass in the forebay to extend the heating zone of the heating unit.

The invention, also, provides an electrically heated plate, preferably, Z-shaped, mounted on the edge of the forebay and provided with a central web, in contact with the glass of the forebay, and having electrical heat units mounted thereon and an overhanging flange that overhangs the edge portion of the glass of the forebay to extend, by radiation, the zone heated by the plate.

Structures containing the invention may partake of different forms and may be varied in their details and still embody the invention. To illustrate a practical application of the invention, I have selected a forebay as an example of the various structures containing the invention and shall describe the selected forebay and method containing my invention hereinafter. The particular structure selected is shown in the accompanying drawings.

Figure 2:
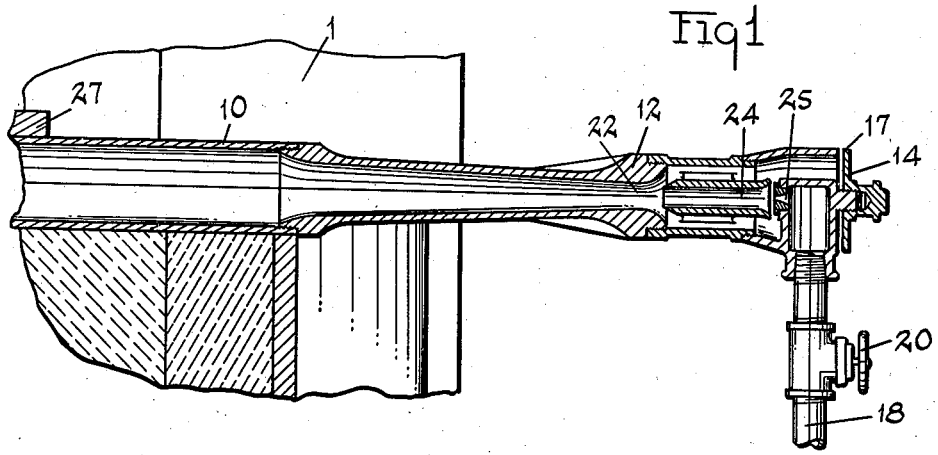
Figure 3:
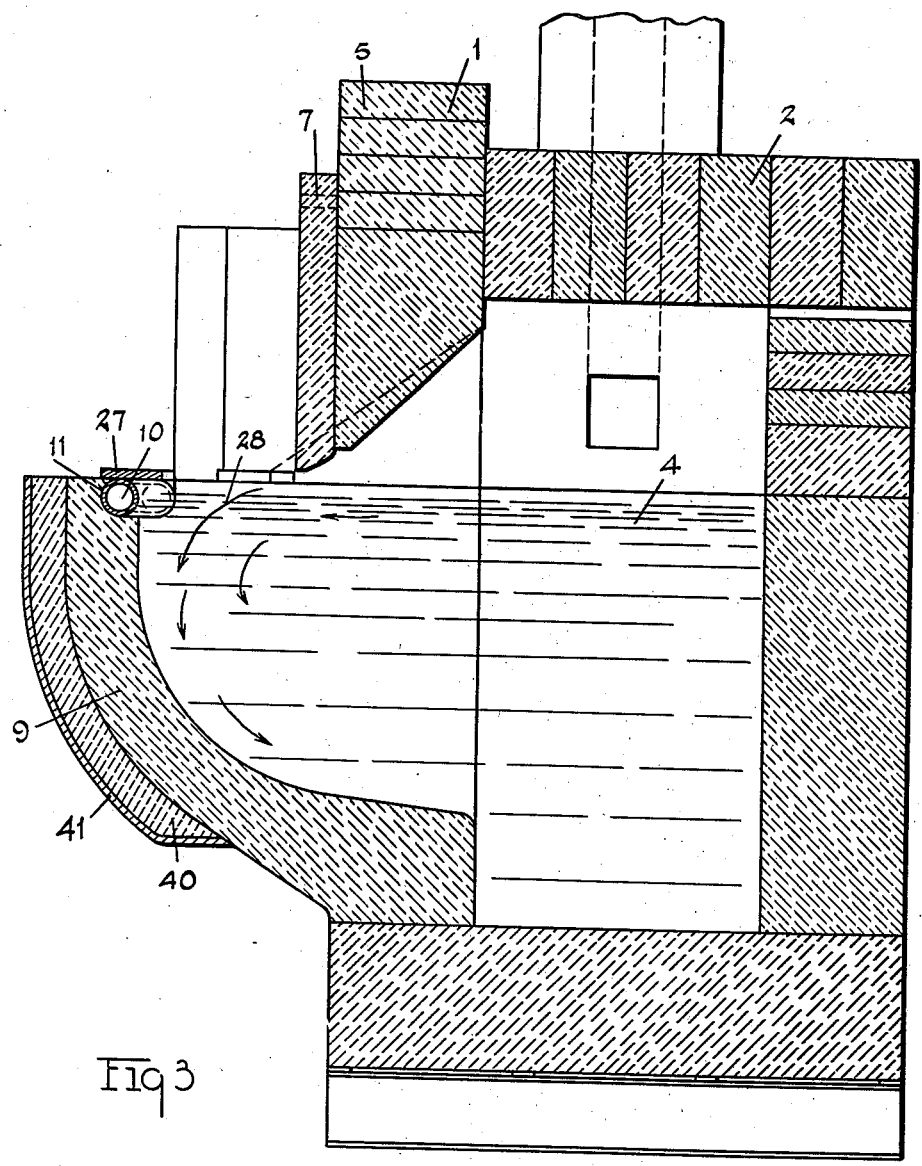
Figure 4:
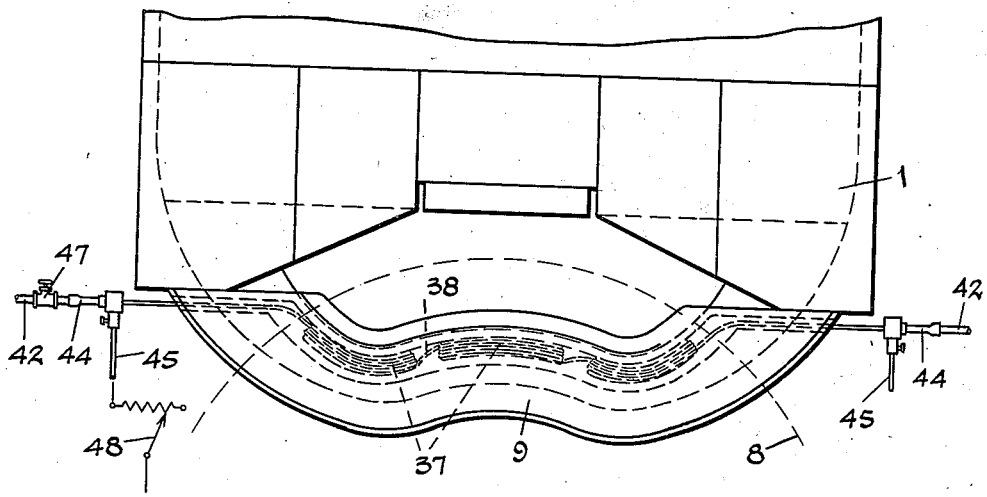
Figure 5:
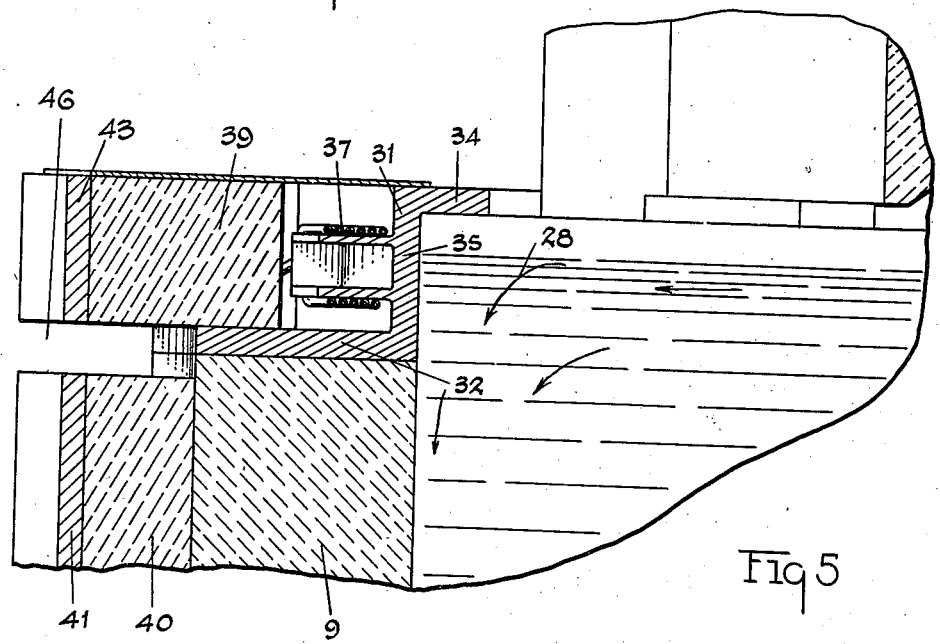

Fig. 1 is a top view of a forebay of a glass-melting furnace and illustrates the marginal heating unit. Fig. 2 illustrates a longitudinal section of the burner by which a flame may be produced that will extend through the tube and, substantially, throughout the marginal length of the forebay. Fig. 3 is a view of a vertical section of the forebay and the tube. Fig. 4 illustrates a top view of a modified form of a forebay. Fig. 5 illustrates a longitudinal section of the forebay shown in Fig. 4.

In the form of constructions illustrated in the figures, the forebay 1 is connected to a suitable glass-melting furnace 2 and, preferably, the molten surface glass 4 is maintained, normally, substantially at a level near the top edge of the forebay. Above the forebay is the usual jack-arch 5 and the adjusting plate 7, commonly used to prevent the heat radiation from the major portion of the glass that is in the forebay. The glass is drawn or removed from the forebay by the usual glass-forming machine, such as a bottle-forming machine, which moves the molds downward into the glass of the forebay and, substantially, along the dotted line 8, indicated in Figs. 1 and 4. The lower ends of the molds are dipped beneath the surface of the glass and, as they are moved along the path of the line 8 and filled by suction of the glass from the forebay, they produce movement of the glass within the forebay.

As is well known, however, in connection with forebays, the marginal portion of the glass near the protruding wall of the forebay, chills more rapidly by radiation than the body of the glass within the forebay and, inasmuch as the molds are dipped into the glass and moved from the vicinity of the edge of the protruding wall of the forebay, the tendency of the glass to chill causes variation in the filling of the molds. The collection of a viscous glass in the molds prevents the filling of all parts of the mold with the same required precision. In order to overcome the chilling effect that exists at the edge of the protruding wall 9, in the forebay of the construction shown in Figs. 1, 2, and 3, a tube 10, formed, preferably, of a metal alloy, which is highly heat conductive, is located in a recess 11 formed in the inner edge of the outer wall and in contact with the surface glass, when maintained at its normal height by the melting of the glass in the furnace. The interior of the tube is heated, preferably, by a gas flame.

One end of the tube 10 is connected to an inspirator burner 12 having a regulator damper 14 that may be rotated to adjust the amount of the secondary air that enters into the burner through the annular opening formed by the edge 17 of the damper 14. The burner 12 is connected to a source of supply of gas under pressure through a pipe 18 and may be quantitatively controlled, by means of a valve 20, in order to produce a flame within the tube 10 that will project throughout the length of the tube and, frequently, produce a sting-out 21 at the end of the tube, remote from the burner. In order to produce the extended flame within the tube, the burner 12 may be provided with a Venturi-shaped tube 22 and, also, may be provided with a short tube 24 that is spaced not only from the Venturi tube 22, but, also, from the outlet 25 of the gas to produce the maximum draft or pressure differential, as it passes through the tube 24 and the Venturi tube 22, to draw the secondary air in the burner.

To extend the heated zone in the forebay, a metal plate 27 is located on the tube 10 and has a portion that overhangs a part of the surface glass 4 within the forebay to form, with the tube, an extended radiant, to produce glass of high fluidity in the region of the edge of the forebay, which may, easily, circulate through the glass in the forebay, and cause distribution of the heated glass over the body of the glass in the forebay.

As is common in forebays, the heat conducted from the glass through the wall of the forebay causes gradual cooling of the glass in contact with the protruding wall of the forebay and the usual movement of the glass from near the furnace, by convection, as indicated by the arrows 28. It moves slightly below and past the glass, locally heated by the heat units at the edge of the forebay, and slightly beneath the heated glass.

In the form of construction shown in Figs. 4 and 5, the inner, upper edge of the forebay is electrically heated to compensate for the heat loss from the glass that occurs, particularly, in the marginal portion of the surface glass. A metal Z-plate 31 is mounted on the edge of the protruding wall of the forebay. The Z-plate extends the length of the wall and has a supporting flange 32 that is placed on the upper edge of the forebay and a flange 34 that overhangs the marginal edge portion of the surface glass in the forebay. The web 35, from which the flanges 32 and 34 laterally extend, is disposed in contact with the glass in the forebay when the glass is maintained at its normal height.

The Z-plate 31 is electrically heated by a plurality of heat units distributed at spaced points along the plate. The web 35 has a plurality of bosses 37, and interconnected tubular electrical conductors 38 are bent to shape to surround the bosses and are fitted over the bosses and connected to a source of current at the opposite ends of the connected heat units located on the bosses through the lines 45 as controlled by the rheostat 48. The tubular conductors are, also, connected to a source of supply of cooling medium, such as to water through the pipe 42, the valve 47 and the fluid restrictors 44, having desired restricted passageways, at one end and to a point of discharge of water at the other end. The electrical current and the flow of the water is relatively controlled to produce the desired heat, to heat the Z-plate to the required temperature and, yet, prevent the electrical conductors from becoming overheated. Any number of heat units may, thus, be formed and disposed on the web of the Z-plate to distribute the heat over the Z-plate and, particularly, the web 35 that is in contact, on one side, with the marginal edge portion of the glass of the forebay, and, also, the overhanging flange 34 that extends the zone of heat produced by the heat units. The heat is, thus, conducted from the web and radiated from the flange to the marginal portion of the glass of the forebay, in the same manner that it is conducted and radiated to the glass in the form shown in Figs. 1, 2, and 3.

Preferably, to reduce the heat loss in the forms shown in the drawings, the outer surface of the wall of the forebay is covered with refractory blocks 40 and, if desired, a metal protective apron 41 may be placed on the outside of the wall of the forebay for retaining the refractory blocks 40 in position and protect the forebay against injury by movement of the molding machine to and from the forebay. To prevent escape of glass between the flange 32 and the wall 9 of the forebay, in the form shown in Fig. 5, the blocks 40 terminate below the edge of the flange 32 of the plate 31, and a row of refractory blocks 39 and, if desired, a bonding strip 43 for bonding the blocks 39 are located on the flange 32 of the plate to form the slot 46 and permit the temperature of the atmospheric air to cool the edge of the plate and freeze any glass that may reach the outer edge of the plate.

I claim:

1. A forebay of a glass-melting furnace, the forebay having a recess formed in the inner surface of its outer side wall and extending substantially the length of the wall and located substantially at the normal level of glass in the forebay; a metal tube located in the recess and extending substantially the length of the recess and in contact with the margin of the surface glass; a burner connected to one end of the tube; and means for connecting the burner with a source of supply of fuel gas under pressure to cause a flame to project into and substantially the length of the tube to conduct the heat of the flame from within the tube to the glass at the margin.

2. A forebay of a glass-melting furnace, the forebay having a recess formed in the inner edge of its outer side wall and extending substantially the length of the wall and located substantially at the normal level of glass in the forebay; a metal tube located in the recess and extending substantially the length of the recess and in contact with the margin of the surface glass; a burner connected to one end of the tube; means for connecting the burner with a source of supply of fuel gas under pressure to cause a flame to project into and substantially the length of the tube to conduct the heat of the flame from within the tube to the glass at the margin; and a metal, heat-radiant plate located on the tube and extending over a portion of the glass in the forebay to radiate heat to the surface glass at the margin.

3. In a forebay of a glass-melting furnace, a heat-producing element located on the inner surface of the outer wall of the forebay and at the normal level of the molten glass in the forebay and extending substantially the full length of the wall and in contact with the margin glass of the forebay, the said heating element comprising a metal, heat-conductive plate having a portion overhanging the margin of the glass of the forebay, a tube in contact with the marginal glass and connected to the plate, and an inspirator burner connected to one end of the tube; and means for connecting the burner with a source of supply of fuel gas under pressure to cause the flame to project into the tube substantially throughout the length of the tube to heat the margin glass by conduction and radiation from the heat element.

4. In a forebay of a glass-melting furnace, a heat element located on the inner surface of the outer wall of the forebay and at the normal level of the molten glass in the forebay and extending substantially the full length of the wall and in contact with the margin glass of the forebay, the said heating element comprising a metal, heat-conductive plate having a portion overhanging a part of the glass of the forebay and a heat-conductive part connected to the first named heat-conductive part and located in contact with the marginal glass in the forebay; and means for uniformly heating the said second part throughout the length of said heat-conductive part to heat glass in contact therewith and conduct heat to the first named part.

5. In a forebay of a glass-melting furnace, a heat-producing element located on the inner surface of the outer wall of the forebay and at the normal level of the molten glass in the forebay and extending substantially the full length of the wall and in contact with the margin glass of the forebay, the said heating element comprising a heat-conductive part located above and extending over the surface of the glass in the forebay and a heat-conductive part extending upwardly to the first named heat-conductive part and located in contact with the marginal glass in the forebay when the glass is at its normal level in the forebay; and means for uniformly heating the said second part throughout its length to heat glass in contact therewith and conduct heat to the first named part; and a third heat-conductive part connected to said second part at a point remote from the said first named heat-conductive part, the wall of the forebay having an inwardly extending slot extending along said third part for distributing cooling air over the said third part to prevent leakage of the glass between the heat-producing element and the wall and beneath the said third part.

GEORGE W. BATCHELL.